Patented Sept. 2, 1930

1,774,500

UNITED STATES PATENT OFFICE

CHARLES E. BURKE, OF WILMINGTON, DELAWARE, ASSIGNOR TO E. I. DU PONT DE NEMOURS & COMPANY, OF WILMINGTON, DELAWARE, A CORPORATION OF DELAWARE

PENTAERYTHRITE ETHERS AND PROCESS OF PREPARING THEM

No Drawing.   Application filed January 27, 1928. Serial No. 250,093.

This invention relates to pentaerythrite ethers and more particularly to methods of preparing same.

The pentaerythrite ethers may be prepared by mixing pentaerythrite with an ester of an inorganic acid in solution, an organic solvent and a fixed alkali and heating the mixture in an autoclave to reaction temperature.

The following is a specific example of one method of preparing pentaerythrite ethers.

Dissolve 775 grams of ethyl chloride in 1400 grams of benzine, and add 400 grams of pentaerythrite (approximately 95% pure) and 520 grams of flaked caustic soda. Heat the whole mass in a nickel autoclave for approximately eight hours, raising the temperature to about 150° C. in the course of two hours and maintaining at about 150° C. for the remainder of the time. This reaction is carried out at a pressure of approximately 200-210 pounds per square inch. When the reaction is completed, allow the mass to cool over night, filter, and distill off the benzine from the filtrate. Then fractionate the residual material under reduced pressure, taking three fractions. The first fraction distills at a temperature of 150°-165° C. under a pressure of 44 mm. mercury, the second fraction distills at 165°-200° C. under a pressure of 50 mm., and the third fraction at 200°-260° C. An analysis of these fractions indicates that the first fraction consists of approximately 80% triethyl ether and 20% diethyl ether; the second fraction, 20% triethyl ether and 80% diethyl ether; and the third fraction 87% diethyl ether, and 12% monoethyl ether.

All three fractions are pale yellow oils and the viscosity of the third fraction is much higher than that of fractions one and two.

In place of a chloride, such as ethyl chloride, there may be used esters of other inorganic acids, for example, bromides, iodides, sulfates and the like; and in place of ethyl chloride there may be used esters containing other organic radicals, for example, methyl chloride, butyl chloride, benzyl chloride and the like.

These pentaerythrite ethers are, in general, useful as solvents, softeners and plasticizers for cellulose derivatives, for example, cellulose ethers or for cellulose esters such as cellulose nitrate, cellulose acetate and the like. The following is one method suitable for producing compositions of this nature. Take 100 parts of a cellulose derivative, such as cellulose nitrate, and from 2 to 60 parts of pentaerythrite ether, for example, the diethyl ethers, and to this add a sufficient quantity of a mutual solvent to form a plastic mass. Such a composition may be plasticized in a mixer followed by rolling, cake-pressing and sheeting, according to the methods known to the plastic art, or the composition may be dissolved in a suitable volatile solvent and thinned to a consistency suitable for a coating composition with or without the addition of oils, resins, pigments and the like.

As many apparently widely different embodiments of this invention may be made without departing from the spirit thereof, it is to be understood that I do not limit myself to the foregoing examples or description, except as indicated in the following patent claims.

I claim:

1. The process of preparing pentaerythrite ethers which comprises heating an ester of an inorganic acid with pentaerythrite under pressure in the presence of a solvent and an alkali, and distilling off the solvent.

2. The process of preparing pentaerythrite ethers which comprises heating a halogen ester with pentaerythrite under pressure in the presence of a solvent and an alkali, and distilling off the solvent.

3. The process of preparing pentaerythrite ethers which comprises heating an alkyl chloride with pentaerythrite under pressure in the presence of a solvent and an alkali, and distilling off the solvent.

4. The process of preparing pentaerythrite ethers which comprises heating ethyl chloride with pentaerythrite under pressure in the presence of a solvent and an alkali, and distilling off the solvent.

5. An alkyl ether of pentaerythrite having less than four alkyl groups.

6. An ethyl ether of pentaerythrite having less than four ethyl groups.

7. A diethyl ether of pentaerythrite:

In testimony whereof I affix my signature.

CHARLES E. BURKE.